(12) United States Patent
Hardacker et al.

(10) Patent No.: US 7,860,473 B2
(45) Date of Patent: Dec. 28, 2010

(54) SYSTEMS AND METHODS FOR PROVIDING MILLIMETER WAVE SIGNAL IMPROVEMENTS

(75) Inventors: Robert Hardacker, Escondido, CA (US); Hiroyuki Mita, Saitama (JP); Kenichi Kawasaki, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 751 days.

(21) Appl. No.: 11/488,538

(22) Filed: Jul. 17, 2006

(65) Prior Publication Data

US 2008/0014890 A1    Jan. 17, 2008

(51) Int. Cl.
*H04B 7/00* (2006.01)
(52) U.S. Cl. .............. 455/249.1; 455/234.2; 455/246.1
(58) Field of Classification Search .............. 455/232.1, 455/234.1, 234.2, 246.1, 249.1, 250.1, 254; 375/345
See application file for complete search history.

(56) References Cited

U.S. PATENT DOCUMENTS

| | | | | |
|---|---|---|---|---|
| 5,936,578 | A * | 8/1999 | Driessen et al. | 342/374 |
| 6,052,566 | A * | 4/2000 | Abramsky et al. | 455/67.11 |
| 6,072,998 | A * | 6/2000 | Kaku | 455/234.2 |
| 6,594,479 | B2 | 7/2003 | Anmar et al. | |
| 6,836,519 | B1 * | 12/2004 | Gerlach et al. | 375/345 |
| 7,254,421 | B2 * | 8/2007 | Archiable | 455/574 |
| 2002/0123306 | A1 * | 9/2002 | Masoian | 455/7 |
| 2003/0027530 | A1 | 2/2003 | Levitt et al. | |
| 2003/0181178 | A1 * | 9/2003 | Zerod et al. | 455/232.1 |
| 2003/0181180 | A1 * | 9/2003 | Darabi et al. | 455/234.1 |
| 2003/0207675 | A1 * | 11/2003 | Hughes et al. | 455/234.1 |
| 2004/0041945 | A1 | 3/2004 | Pugel et al. | |
| 2004/0153879 | A1 | 8/2004 | Fukutani et al. | |
| 2004/0171361 | A1 | 9/2004 | Vasanth et al. | |

OTHER PUBLICATIONS

International Search Report and Written Opinion, Feb. 14, 2008.
*Exploiting the 60 GHz Band for Local Wireless Multimedia Access: Prospects and Future Directions*, P. Smulders, IEEE Communications Magazine, pp. 140-147, Jan. 2002.
*A Planar Wideband 80-200 GHz Subharmonic Receiver*, B. Kormanyos et al., IEEE Transactions On Microwave Theory and Techniques, vol. 41, No. 10, pp. 1730-1737, Oct. 1993.

* cited by examiner

*Primary Examiner*—Nguyen Vo
(74) *Attorney, Agent, or Firm*—Dickstein Shapiro LLP

(57) ABSTRACT

A radio frequency receiver includes a receiver circuit for processing RF signals, an antenna to receive millimeter wave RF signals, and an attenuator circuit, coupled between the receiver circuit and antenna. In one embodiment, the attenuator circuit may be used to determine a signal strength of the millimeter wave RF signals, compare this signal strength to a first threshold value. If the signal strength is above the first threshold value, a level of attenuation applied to the millimeter wave RF signals may then be increased.

20 Claims, 5 Drawing Sheets

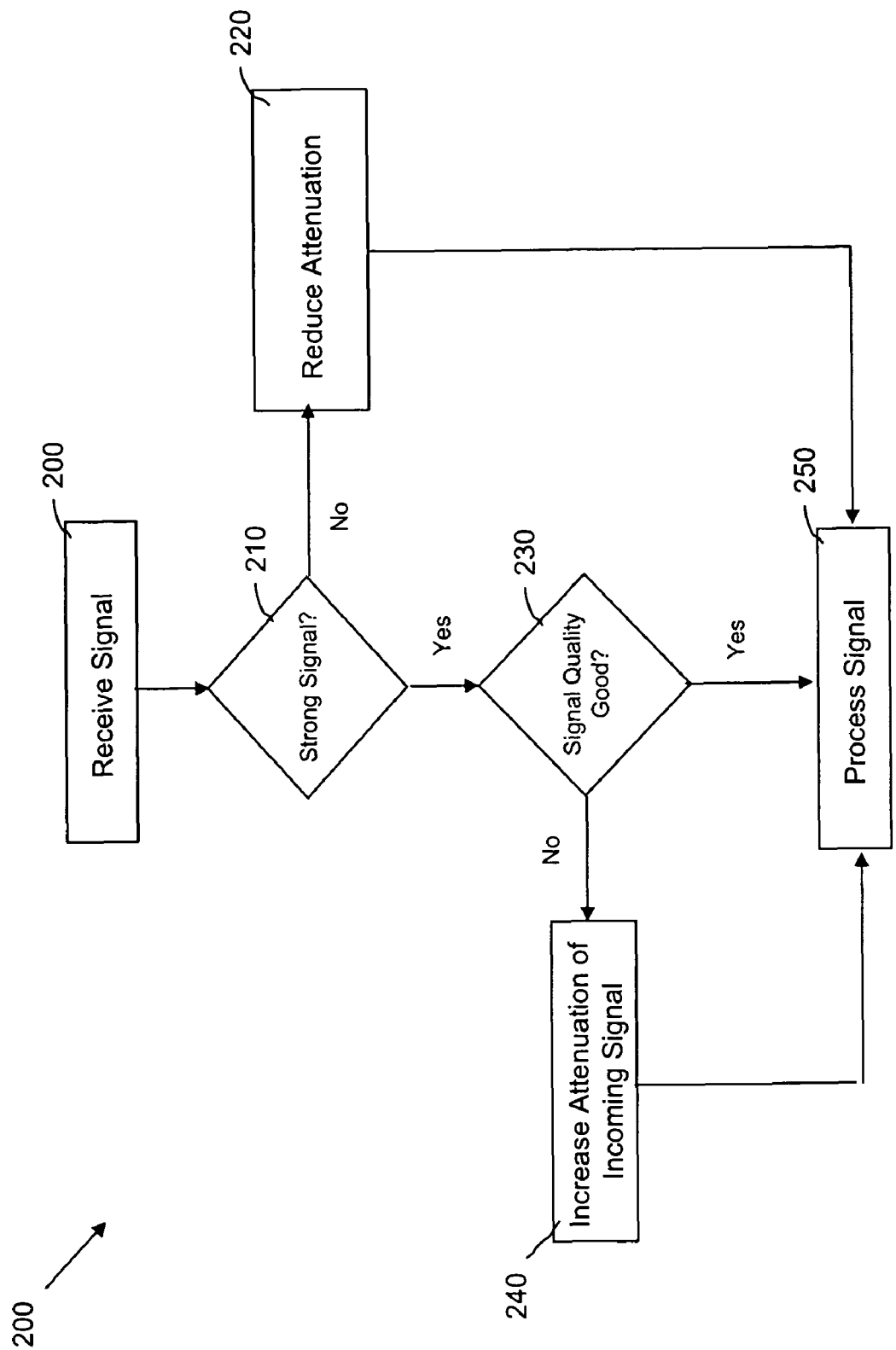

SYSTEMS AND METHODS FOR PROVIDING MILLIMETER WAVE SIGNAL IMPROVEMENTS

FIELD OF THE INVENTION

The invention relates in general to systems and methods for wireless transmissions, and in particular to improving millimeter wave signals.

BACKGROUND

There has recently been a pronounced increase in the types of communication applications that require the use of wireless data transfer. Such applications include, for example, video conferencing, video-on-demand, high speed Internet access, high speed local area networks, online gaming, and high definition television. In the home or office, for example, computing devices continue to be connected using wireless networking systems. Many additional types of devices are also being designed with wireless communication in mind.

At frequencies below about 3 GHz, antennas are generally omnidirectional, which cause antennas in proximity to interfere with each other, or experience what is known as "multipath." At higher frequencies (e.g. from about 3 to about 60 GHz), signals become somewhat directional, which reduces the multipath issue mentioned above. However, at very close distances signal reflections of the receiver and transmitter reintroduce the multipath issue. These reflections cause signal interference and degrade the overall quality of the communication.

The 57-64 GHz ("60 GHz band") band is located in the millimeter-wave portion of the electromagnetic spectrum and has been largely unexploited for commercial wireless applications. In addition to the higher-data rates that can be accomplished in this spectrum, energy propagation in the 60 GHz band has unique characteristics that make possible many other benefits such as excellent immunity to interference, high security, and frequency re-use.

While wireless transmissions in the 60 GHz range exhibit the aforementioned beneficial characteristics, they still suffer from certain drawbacks, including the fact that such transmission typically only span a maximum distance measured in tens of meters. As mentioned above, very short distances between the receiver-side and transmitter-side of a high frequency system will reintroduce the multipath issue and cause signal reception interference. As such, there is a need in the art for a system and method which improves signal quality at millimeter wave frequencies by reducing multipath effects.

BRIEF SUMMARY OF THE INVENTION

Disclosed and claimed herein are systems and methods for providing millimeter wave signal improvements. In one embodiment, a radio frequency receiver includes a receiver circuit for processing radio frequency (RF) signals, an antenna to receive millimeter wave RF signals, and an attenuator circuit, coupled between the receiver circuit and antenna. In one embodiment, the attenuator circuit may be used to determine a signal strength of the millimeter wave RF signals, compare this signal strength to a first threshold value. If the signal strength is above the first threshold value, a level of attenuation applied to the millimeter wave RF signals may then be increased.

Other aspects, features, and techniques of the invention will be apparent to one skilled in the relevant art in view of the following description of the exemplary embodiments of the invention.

BRIEF DESCRIPTION OF DRAWINGS

FIGS. 2A-2B are process diagrams of how a receiver may be used to carry out one or more embodiments of the invention.

DETAILED DESCRIPTION OF THE PREFERRED EMBODIMENT

One aspect of the invention is to provide a radio frequency receiver/transceiver for processing millimeter wave RF signals. In one embodiment, the receiver/transceiver includes a variable attenuator circuit coupled between a receiver circuit and an antenna. The receiver circuit may be used to detect a signal strength, and compare such signal strength to a threshold value. Where the signal strength is above the threshold value, a level of attenuation applied to the millimeter wave RF signals may be increased to improve the signal quality.

In one embodiment, the millimeter wave RF signals have a frequency of between approximately 57 GHz and 95 GHz. The threshold value against which the signal strengths may be compared is related to the specific implementation of the receiver circuit. One skilled in the art would optimize a receiver for an optimum input level range above which the aforementioned threshold level would be set.

Another aspect of the invention is for the aforementioned receiver/transceiver to also compare the signal strength of the received signal to a second threshold value. If the signal strength is below this second threshold value, the level of attenuate applied to the millimeter wave RF signal may be decreased.

Still another aspect of the invention is for the aforementioned receiver/transceiver to also determine a signal quality of the millimeter wave RF signals, and compare this signal quality to a threshold quality value. Where the determined signal quality is below the threshold quality, and the signal strength is above the previously-mentioned threshold strength value, the level of attenuation being applied to the millimeter wave RF signals may be increased.

In another embodiment, rather than compare the signal quality to a threshold quality value, the aforementioned receiver/transceiver may simply determine if the signal quality of the millimeter wave RF signals is unacceptable. If so, the level of attenuation applied to said millimeter wave RF signals may be increased.

Still another aspect of the invention is for the aforementioned receiver/transceiver to be able to determine if the millimeter wave RF signals are reflection signals. If so, the level of attenuation applied to said millimeter wave RF signals may be increased.

In certain embodiments, the invention enables the RF transmission of data in the 60 GHz band at multi-Gigabit per second (Gbps) data rates.

Figure 1A:
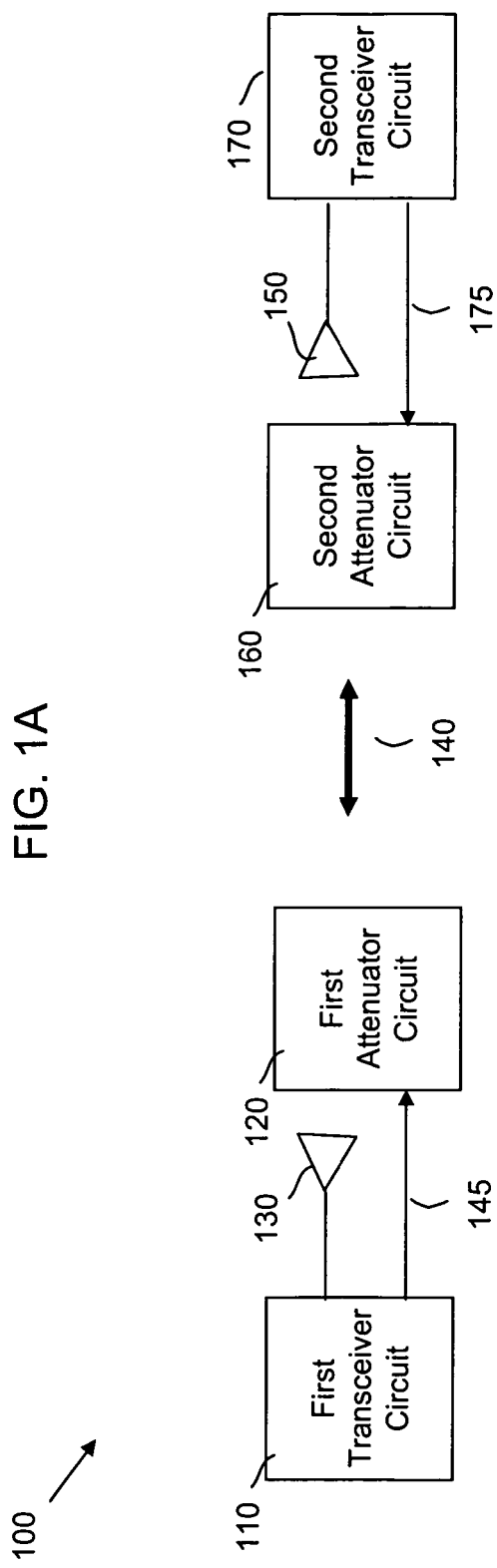
FIG. 1A is one embodiment of a transmission system for carrying out one or more aspects of the invention.

FIG. 1A depicts one embodiment of a wireless communication system 100 for implementing one or more aspects of the invention. In certain embodiments, system 100 may enable the RF transmission of data in the millimeter-wave range at multi-Gbps data rates. In one embodiment, data is transmitted at a rate of between 1 Gbps and 10 Gbps.

As shown in FIG. 1A, system 100 includes a first transceiver circuit 110 for processing millimeter wave signals. In one embodiment, such signals are in the 60 GHz band. System 100 further includes a first attenuation circuit 120, as well as an antenna 130 for receiving and sending millimeter wave signals (i.e., signal 140). The first transceiver circuit 110 provides an RF signal to the antenna 130 which converts the information into an electromagnetic wave (i.e., signal 140). The transmission medium for electromagnetic wave propagation is free space. The level of attenuation provided by first attenuator 120 may be based on a control signal 145 from the first transceiver 110. In one embodiment, control signal 145 may be based on signal quality information received from any known digital demodulation process.

The electromagnetic signal 140 is intercepted by the receiving antenna 150 which converts it back to an RF signal. Second attenuator circuit 160 may then be used to attenuate the signal 150 before passing it to the second transceiver circuit 170. According to one embodiment, attenuators 120 and 160 are variable controlled attenuators. The level of attenuation provided by second attenuator 160 may, in one embodiment, be based on a control signal 175 received from the second transceiver 170. As with control signal 145, control signal 175 may be based on signal quality information received from any known digital demodulation process.

While the system 100 of FIG. 1A is depicted as being a two-transceiver system, in other embodiments more transceivers may be included in the system 100. Similarly, the transceiver circuits 110 and 170 may be comprised of only transmitters and/or receivers. In other embodiments, signal 140 may be transmitted at frequencies above the 60 GHz band, such as up to 95 GHz. Moreover, signal 140 may be encoded with data transmitted at multi-Gigabit per second (Gbps) rates. In certain embodiments, the distance between the individual antennas 130 and 150 may range from centimeters to tens of meters.

Figure 1B:
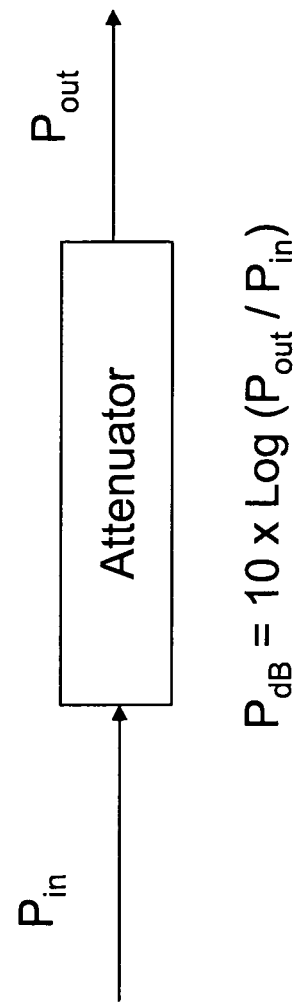
FIG. 1B is a diagram showing how an attenuator of FIG. 1A may attenuate an RF signal.

FIG. 1B illustrates how a signal may be attenuated by one or both of attenuator circuits 120 and 160. The signal power level provided to the attenuator is denoted as $P_{in}$, while the output power level is denoted as $P_{out}$. The amount of attenuation may be expressed in dBs according to the equation, $P_{db}=10 \times Log(P_{out}/P_{in})$. Thus, if half the signal power is lost while passing through the attenuator ($P_{out}/P_{in}=2$), the magnitude of attenuation in decibels is $10 \times Log(2)$, or 3 dB.

Figure 1C:
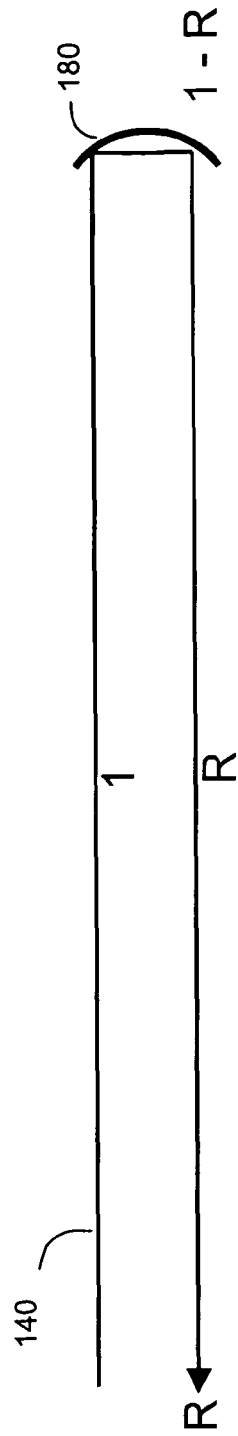
FIG. 1C depicts wireless signal reflection without attenuation.

FIG. 1C depicts one embodiment where signal 140 is reflected without the use of an attenuator. In this embodiment, antenna surface 180 functions as the reflector. Without an attenuator, the reflected signal strength is simply R.

Figure 1D:
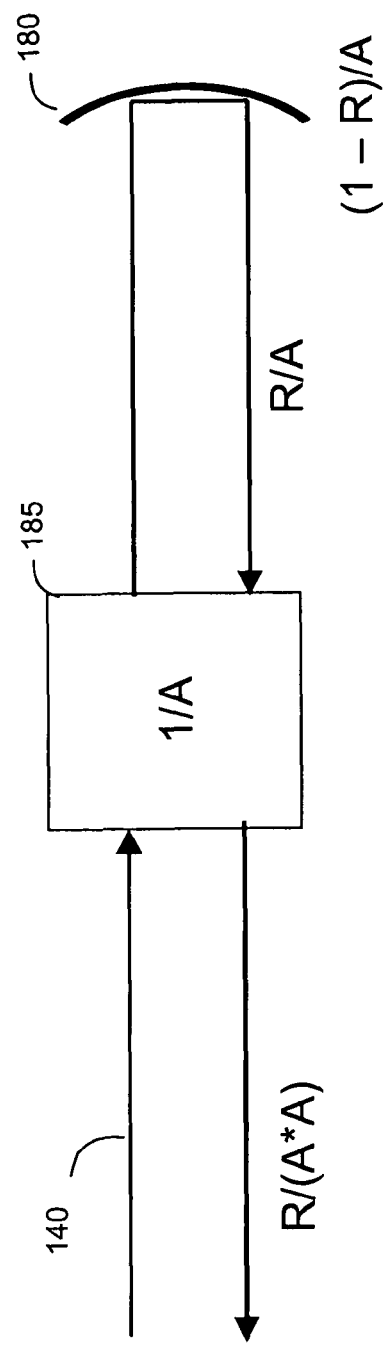
FIG. 1D depicts one embodiment of wireless signal reflection with attenuation.

FIG. 1D, on the other hand, depicts the case where signal 140 is attenuated by attenuator 185 prior to reaching the reflective surface 180. IN this case, the reflected signal actually passes through the attenuator 185 twice, and therefore the amount of attenuation can be represented as R/(A*A), even though the signal delivered to the reflective surface 180 was attenuated by a 1/A factor.

Referring now to FIG. 2A, depicted is a simplified process 200 for how a receiver may implement one or more aspects of the invention. Process 200 begins with the receiving of a signal at block 200. In one embodiment, this signal is a millimeter wave RF signal. Once received, a determination is made at block 210 of whether or not the strength of the signal may be considered strong. In one embodiment, this is done by comparing the strength of the received signal to a predetermined threshold. Typical attenuation may range from 0 dB to 12 dB. If the received signal is not strong (i.e., not above the threshold), then process 200 will move to block 220 where the level of attenuation being applied to the incoming signal, if any, may be reduced. If, on the other hand, the signal is above the predetermined threshold, then process 200 will move to block 230.

At block 230, a determination may be made as to the quality of the received signal. This may be accomplished by measuring various signal parameters that indicate the quality of the signal, such as bit error rate (BER), signal-to-noise ratio (SNR), carrier-to-noise ratio (CNR), number of errors corrected, etc. If such parameters indicate that signal quality is unacceptable, the amount of attenuation applied to the received signal may be increased at block 240. If such parameters indicate that signal quality is acceptable, the signal may be processed in the normal course at block 250. It should be appreciated that the level of attenuation (or the rate at which it changes) may be a function of the quality of signal received, or alternatively, it may predetermined. In one embodiment, the level of attenuation may be changed from about 0 dB to about 12 dB at blocks 220 and 240.

Using the process of FIG. 2A, a relatively constant signal quality can be maintained and the effects of multipath minimized. This is made possible by the fact that as the distance between a given transmitter and receiver increases, the signal strength will decrease causing the attenuation level to decrease (block 220). Alternatively, as the distance between a given transmitter and receiver decreases, the signal strength will increase causing the attenuation level to increase (block 240).

Figure 2B:
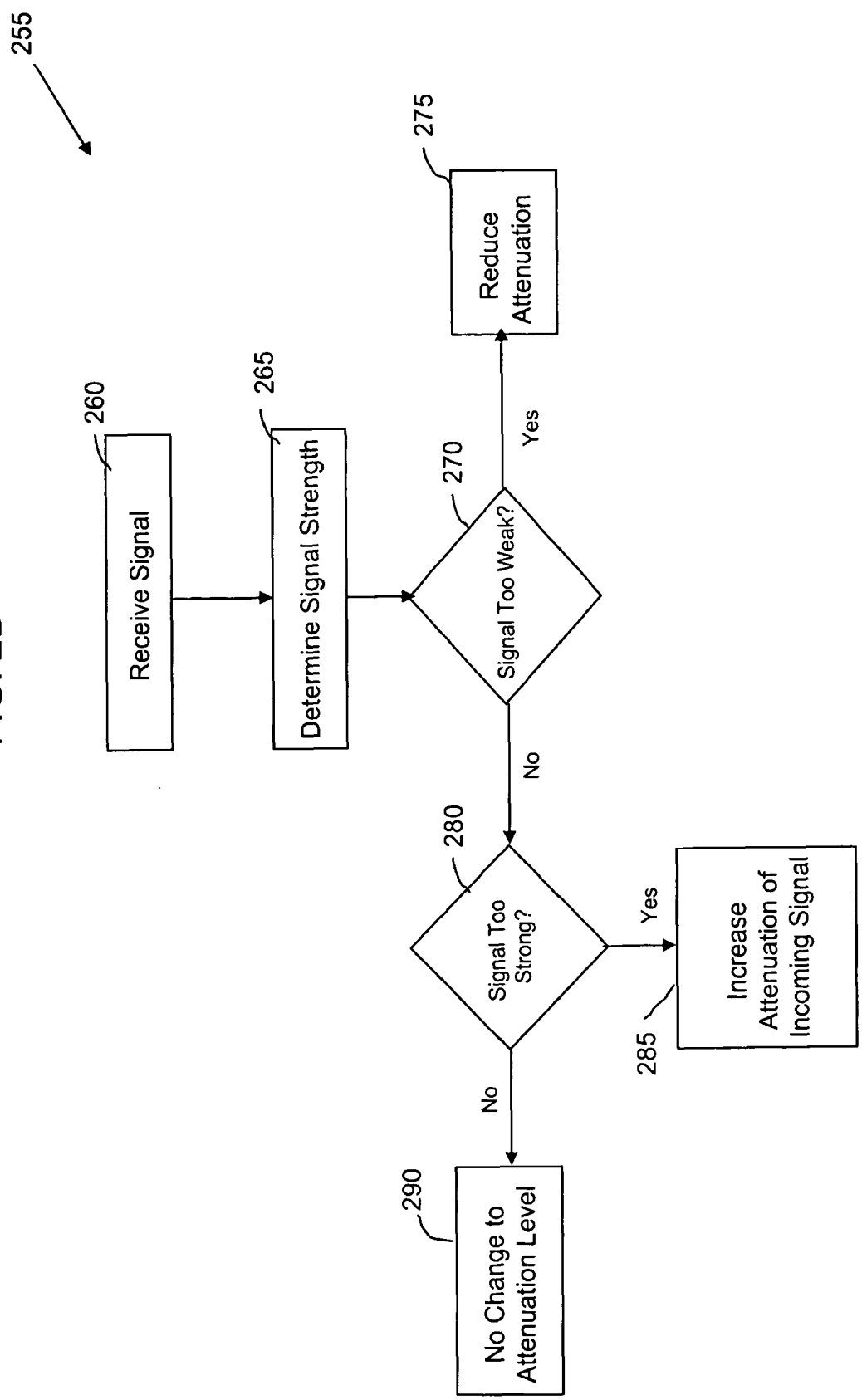

Referring now to FIG. 2B, depicted is another embodiment of a process 255 for how an RF receiver can implement one or more aspects of the invention. Process 255 begins with the receiving of a signal at block 260. Once received, a determination is made at block 265 of how strong the received signal is (e.g., dB level). If the received signal is too weak (as determined at block 270), then the level of signal attenuation applied to incoming signals may be reduced at block 275. Moreover, the amount of the attenuation decrease at block 285 may be between about 0 dB and 12 dB. If, on the other hand, the received signal is not too weak, then process 255 will continue to block 280.

At block 280, if a signal is determined to be too strong, process 255 will move to block 285 where the level of signal attenuation may be increased. Moreover, the amount of the attenuation increase applied at block 285 may be between about 0 dB and 12 dB.

If it is alternatively determined at block 280 that the signal is not too strong, process 255 will continue to block 290 where the current signal attenuation level will not be changed.

Using the process of FIG. 2B, a relatively constant signal quality can be maintained and the effects of multipath minimized. This is made possible by the fact that as the distance between a given transmitter and receiver increases, the signal strength will decrease causing the attenuation level to be decreased (block 275). Alternatively, as the distance between a given transmitter and receiver decreases, the signal strength will increase causing the attenuation level to be increased (block 285). If the distance remains constant, so too will the current attenuation level (block 290).

Figure 3:
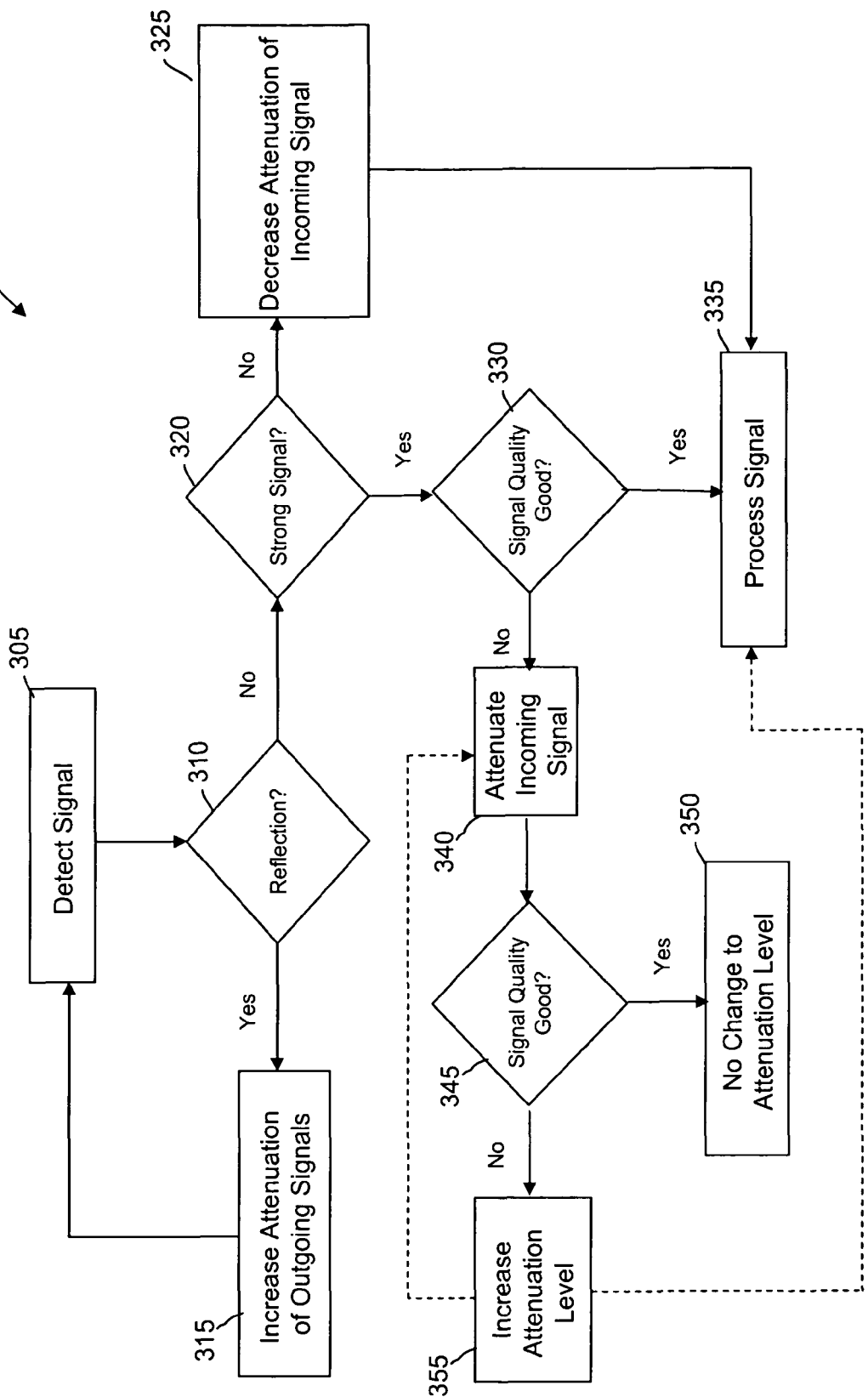
FIG. 3 is a process diagram of how a transceiver may be used to carry out another embodiment of the invention.

FIG. 3 depicts an embodiment of process 300 for how a transceiver may be used to implement one or more aspects of the invention. Process 300 begins at block 305 with the detection of an RF signal. Once a signal is detected, process 300 will continue to block 310 where a determination may be made as to whether the detected signal is a reflection of a signal sent by the transceiver in question, or whether it is a signal originating from another source (e.g., a second transceiver).

If it is determined at block 310 that the signal is in fact a reflection, then process 300 will continue to block 315 where the amount of attenuation applied to outgoing signals may be increased. In one embodiment, the amount of attenuation may be increased by between about 0 dB and 12 dB. If, on the other hand, it is determined that the detected signal is not a reflection, then the process 300 will continue to block 320. At block 320, the strength of the detected signal may be determined. In one embodiment, this is done by comparing the strength of the detected signal to a predetermined threshold. One skilled in the art would identify a preferred signal strength range based upon the implementation. If the received signal is determined to not be strong, then process 300 will move to block 325 where the level of attenuation being applied to the detected signal may be decreased. Thereafter, the signal may be processed in the normal course at block 335.

If, on the other hand, the signal is above the predetermined threshold, then process 300 will move to block 330. At block 330, a determination may be made as to the quality of the detected signal. This may be accomplished by measuring various signal parameters that indicate the quality of the signal, such as BER, SNR, etc. If such parameters indicate that signal quality is acceptable, the signal may be processed in the normal course at block 335. If, on the other hand, the signal quality is determined at block 330 to be unacceptable, then process 300 will continue to block 340 where the detected signal may be attenuated. It should be appreciated that the level of attenuation may be a function of the quality of signal received, or it may predetermined.

Once the detected signal is attenuated at block 340, it may again be checked for quality (block 345). If the signal quality is now acceptable, then no change is made to the attenuation level applied to the signal (block 350). If, on the other hand, the signal quality is still unacceptable, the level of attenuation applied to the incoming signal may be increased at block 355.

After the level if attenuation is increased at block 355, process 300 may proceed in one of two ways. In one embodiment, the process may revert back to block 340 where the signal is again attenuated, but this time at the higher attenuation level. This may continue until the signal quality is acceptable, as determined at block 345. Alternatively, the process 300 may proceed to block 335 for signal processing, with the increased level of attenuation being applied prospectively to future incoming signals.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A radio frequency receiver comprising:
    a receiver circuit for processing radio frequency (RF) signals;
    an antenna to receive millimeter wave RF signals; and
    an attenuator circuit coupled between said receiver circuit and antenna, wherein said attenuator circuit is to,
        determine, prior to assessing a signal quality of the millimeter wave RF signals, a signal strength of said millimeter wave RF signals,
        compare said signal strength to a first threshold value, and if said signal strength is above the first threshold value,
        increase a level of attenuation applied to said millimeter wave RF signals, and
        determine if said millimeter wave RF signals are reflection signals, and if so increase the level of attenuation applied to said millimeter wave RF signals.

2. The radio frequency receiver of claim 1, wherein said millimeter wave RF signal have a frequency of between approximately 57 GHz and 95 GHz.

3. The radio frequency receiver of claim 1, wherein said attenuator circuit is further to,
    compare said signal strength to a second threshold value different from the first threshold value, and if said signal strength is below the second threshold value,
    decrease the level of attenuate applied to said millimeter wave RF signal.

4. The radio frequency receiver of claim 1, wherein said attenuator circuit is further to,
    determine, after determining that the signal strength is above the first threshold value, the signal quality of said millimeter wave RF signals,
    compare said signal quality to a threshold quality value, and if said signal quality is below the threshold quality, and the signal strength is above the first threshold value,
    increase the level of attenuation applied to said millimeter wave RF signals.

5. The radio frequency receiver of claim 1, wherein said attenuator circuit is further to,
    determine, after determining that the signal strength is above the first threshold value, if the signal quality of said millimeter wave RF signals is unacceptable, and if so
    increase the level of attenuation applied to said millimeter wave RF signals.

6. The radio frequency receiver of claim 1, wherein said attenuator circuit is further to,
    determine if said millimeter wave RF signals are reflection signals
    prior to assessing the signal strength of said millimeter wave RF signals.

7. The radio frequency receiver of claim 1, wherein said signal quality of the millimeter wave RF signals is assessed by bit error rate (BER) of the millimeter wave RF signals.

8. A communication system comprising:
    a first transceiver including a first attenuation circuit and a first antenna for sending and receiving millimeter wave radio frequency (RF) signals; and
    a second transceiver for communicating with the first transceiver, the second transceiver including a second attenuation circuit and a second antenna for sending and receiving the millimeter wave RF signals,
    wherein in the first and second transceiver are each to,
        determine, prior to assessing signal quality of any received millimeter wave RF signals, signal strengths of received millimeter wave RF signals,
        compare said signal strengths to a first threshold value, and if a given signal strength is above the first threshold value,
        increase a level of attenuation applied to said millimeter wave RF signals, and
        determine if said millimeter wave RF signals are reflection signals, and if so increase the level of attenuation applied to said millimeter wave RF signals.

9. The communication system of claim 8, wherein said millimeter wave RF signal have a frequency of between approximately 57 GHz and 130 GHz.

10. The communication system of claim 8, wherein said first and second transceiver circuits are each further to,
   compare said signal strengths to a second threshold value, different from the first threshold value, and if the given signal strength is below the second threshold value,
   decrease the level of attenuation applied to said millimeter wave RF signal.

11. The communication system of claim 8, wherein each of said first and second transceivers are further to,
   determine, after determining that any strengths are above the first threshold value, signal qualities of corresponding ones of said millimeter wave RF signals,
   compare said signal qualities of the corresponding millimeter wave RF signals to a threshold quality value, and if a given signal quality is above the threshold quality, and the given signal strength is above the first threshold value,
   increase the level of attenuation applied to said corresponding millimeter wave RF signals.

12. The communication system of claim 8, wherein each of said first and second transceivers are further to,
   determine, after determining that any signal strengths are above the first threshold value, if signal qualities of said millimeter wave RF signals are unacceptable, and if so
   increase the level of attenuation applied to said corresponding millimeter wave RF signals.

13. The communication system of claim 8, wherein each of said first and second transceivers are further to,
   determine if said millimeter wave RF signals are reflection signals
   prior to assessing the signal strength of said millimeter wave RF signals.

14. The communication system of claim 8, wherein said signal quality of the millimeter wave RF signals is assessed by bit error rate (BER) of the millimeter wave RF signals.

15. A method comprising:
   receiving a millimeter wave radio frequency (RF) signal;
   applying a level of attenuation to the millimeter wave RF signals;
   comparing, prior to assessing a signal quality of the millimeter wave RF signals, said signal strength to a first threshold value, and if said signal strength is above the first threshold value,
   increasing a level of attenuation applied to said millimeter wave RF signals, and
   determining if said millimeter wave RF signals are reflection signals, and if so increasing the level of attenuation applied to said millimeter wave RF signals.

16. The method of claim 15, wherein said millimeter wave RF signal have a frequency of between approximately 57 GHz and 95 GHz.

17. The method of claim 15, further comprising:
   comparing said signal strength to a second threshold value different from the first threshold value, and if said signal strength is below the second threshold value, the method further comprises modifying said level of attenuation by decreasing the level of attenuation applied to said millimeter wave RF signal.

18. The method of claim 15, further comprising:
   determining, after determining that said signal strength is above the first threshold value, a signal quality of said millimeter wave RF signals;
   comparing said signal quality to a threshold quality value, and if said signal quality is below the threshold quality, and the signal strength is above the first threshold value, the method further comprises modifying said level of attenuation by increasing the level of attenuation applied to said millimeter wave RF signals.

19. The method of claim 15, further comprising:
   determining, after determining that the signal strength is above the first threshold value, if a signal quality of said millimeter wave RF signals is unacceptable; and if so
   modifying said level of attenuation by increasing the level of attenuation applied to said millimeter wave RF signals.

20. The method of claim 15, wherein said signal quality of the millimeter wave RF signals is assessed by bit error rate (BER) of the millimeter wave RF signals.

* * * * *